United States Patent [19]

Coburn et al.

[11] Patent Number: 4,686,823
[45] Date of Patent: Aug. 18, 1987

[54] SLIDING JOINT FOR AN ANNULAR COMBUSTOR

[75] Inventors: Robert E. Coburn, Mansfield Center; John A. Matthews, Melrose, both of Conn.

[73] Assignee: United Technologies Corporation, Hartford, Conn.

[21] Appl. No.: 856,729

[22] Filed: Apr. 28, 1986

[51] Int. Cl.[4] .......................... F02C 7/20; F02C 1/00
[52] U.S. Cl. .................................... 60/39.32; 60/740; 60/752
[58] Field of Search .................... 60/39.31, 39.32, 740, 60/748, 752, 756

[56] References Cited

U.S. PATENT DOCUMENTS

| | | | |
|---|---|---|---|
| 2,432,359 | 12/1947 | Streid | 60/39.08 |
| 2,479,573 | 8/1949 | Howard | 60/39.37 |
| 2,581,999 | 1/1952 | Blatz | 60/39.32 |
| 2,722,801 | 11/1955 | Lombard . | |
| 2,748,567 | 6/1956 | Dougherty | 60/39.32 |
| 2,884,754 | 5/1959 | Sevcik . | |
| 3,371,482 | 3/1968 | Camboulives et al. | 60/39.32 |
| 3,670,497 | 6/1972 | Sheldon . | |
| 3,965,066 | 7/1976 | Sterman et al. | 60/39.32 |
| 4,365,470 | 12/1982 | Matthews et al. | 60/39.32 |

FOREIGN PATENT DOCUMENTS 2713414  9/1978  Fed. Rep. of Germany ..... 60/39.32

Primary Examiner—Louis J. Casaregola
Assistant Examiner—Timothy S. Thorpe
Attorney, Agent, or Firm—Troxell K. Snyder

[57] ABSTRACT

A sliding expansion joint (68) for the interface between an annular combustor head (24) and a downstream-extending liner (47) of a combustion chamber (18) includes an inward facing cylindrical surface (78) on the head (24) and a thickened upstream ring (74) in the liner (47). A cooled, radially extending bulkhead (36) isolates the joint (68) thermally from the high temperature combustion reaction (50). A region of reduced static air pressure is induced adjacent the joint (68) by the flow of air (86) over the convex combustor dome (30). Any air leakage through joint (68) adds to the existing flow of cooling air (106) adjacent the liner (47).

5 Claims, 2 Drawing Figures

SLIDING JOINT FOR AN ANNULAR COMBUSTOR

CROSS REFERENCE TO RELATED APPLICATION

Reference is hereby made to the co-pending, commonly assigned U.S. patent application entitled "Combustor Head" by R. E. Coburn, J. A. Matthews, and M. A. Sattar, filed on even date herewith and disclosing related subject matter.

FIELD OF THE INVENTION

The present invention pertains to an expansion joint, and more particularly, to an expansion joint for use in the combustion section of a gas turbine engine.

BACKGROUND

The use of annular combustion chambers in axial flow gas turbine engines is a well known design feature which is particularly well suited for providing a high rate of heat release in a limited volume. Not only must such chambers provide an optimum combustion environment to ensure combustor efficiency and engine operability over a wide operating range, but they must also protect the surrounding engine structure from the contained high temperature combustion reaction.

As with any components used in the working gas stream of a gas turbine engine, and especially for those engines used in the air transport industry, a significant premium is placed on configurations having the features of light weight, simplicity of assembly, and the fewest individual components. Prior art combustion chambers have utilized an annular combustor head, supported by the outer engine casing, and adapted to receive a plurality of circumferentially distributed fuel nozzles therewithin. The head-nozzle structure is disposed immediately downstream of the engine axial compressor section, forming the leading edge of the combustion chamber defined by the head and two axially extending, concentric chamber liners disposed immediately downstream of the head.

The annular combustion zone formed by the head and combustor liners contains the combustion reaction and shields the engine inner and outer casings from the high temperature reaction. Both the head and inner and outer chamber liners are typically cooled by diverting portions of the annular air stream received from the compressor section.

During startup, shutdown, and other load transients the combustion chamber components may experience a wide variation of material temperatures. Such variations produce differing magnitudes of thermal expansion between the liners and head, requiring some form of accommodating joint or mounting in order to maintain sealing and/or structural integrity. The use of sliding expansion joints in combustion chambers is well known in the prior art, achieving both simplicity in design and assembly and providing the necessary flexible interaction between different components. Such sliding joints, however, are subject to separation between the concentric components as a result of an uneven axial or circumferential heat distribution. It will be appreciated by those skilled in the art of combusting systems that the admission of an unexpected and unpredictable flow of air into the combustion reaction as a result of such seal separation quickly degrades the quality and efficiency of the reaction.

What is needed is an expansion joint which is resistant to the wide temperature variations occurring in the combustion chamber and which is configured so as to reduce and minimize the effect of any leakage which may possibly occur.

SUMMARY OF THE INVENTION

It is therefore an object of the present invention to provide a leak resistant axial expansion joint between an annular combustor head and an annular combustion chamber liner.

It is further an object of the present invention to provide a joint which is disposed in a relatively cool location and shielded from the high temperature combustion reaction.

It is further an object of the present invention to provide a joint which is located in a region of lowered static pressure for reducing the flow of gas into the combustion chamber should separation occur in the joint.

It is still further an object of the present invention to provide a means for channeling any occurring gas leakage within the combustion chamber so as to avoid degradation of the quality of the combustion reaction.

The present invention provides an improved, leak resistant axial sliding joint for accommodating differential thermal expansion between an annular combustor head and a downstream annular combustion chamber liner. The subject arrangement is simply fabricated and easily made up during assembly of the combustion chamber, and is resistant to the effects of uneven heat distribution and thermal transients.

According to the present invention, a cylindrical surface is provided on the annular combustor head for slidably engaging a corresponding sealing ring formed at the upstream edge of the combustor liner. The sliding interface is located in a zone of relatively cool temperature and shielded from the hot combustion reaction by a radially extending cooled bulkhead. The joint is located immediately downstream of the convex, upstream facing dome of the combustor head in a region of reduced static air pressure, thereby experiencing a reduced rate of air leakage into the chamber due to any separation of the head and sealing ring.

According to the preferred embodiment of the present invention, the sealing ring is disposed radially within the head cylindrical surface, reducing the likelihood of seal separation due to heating of the downstream combustor liner. A slight radial interference fit is also provided between the head and ring to further ensure a good sliding seal at all engine operating conditions.

The combustor head is further provided with an annular trailing lip for channeling any air leakage between the ring and head into an axially flowing cooling film adjacent the reaction-facing surface of the chamber liner.

DETAILED DESCRIPTION OF THE PREFERRED EMBODIMENT

Figure 1:
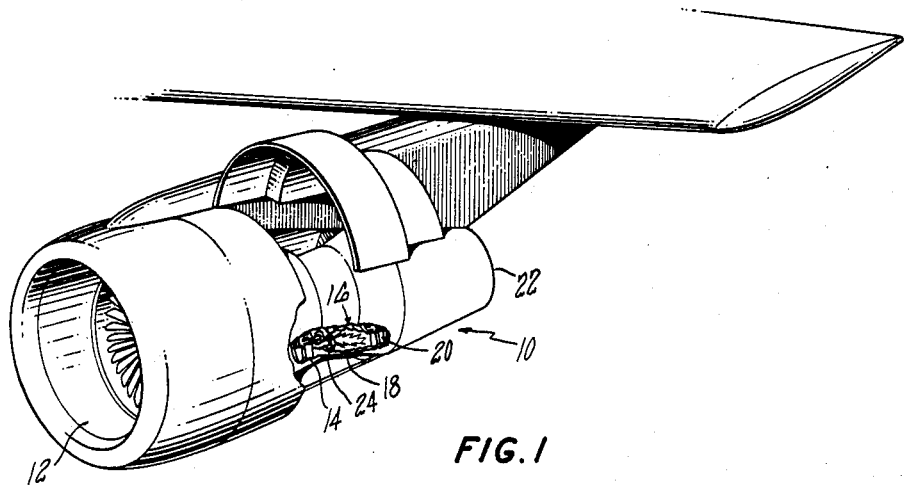
FIG. 1 shows a general arrangement of an axial flow gas turbine engine.

FIG. 1 shows a general arrangement of an axial flow gas turbine engine 10 as it would appear in an aircraft installation or the like. During operation, ambient air is ingested through the forward inlet 12, passing annularly through a multistage axial compressor 14, next entering the downstream combustor section 16. As discussed hereinabove, the combustor section 16 includes a combustion chamber 18 formed by a concentric pair of chamber liners and an upstream combustor head 24.

Hot gases exiting the combustor section 16 enter the downstream turbine section 20 wherein the pressurized, heated combustion products are expanded before exiting the outlet nozzle 22.

Figure 2:
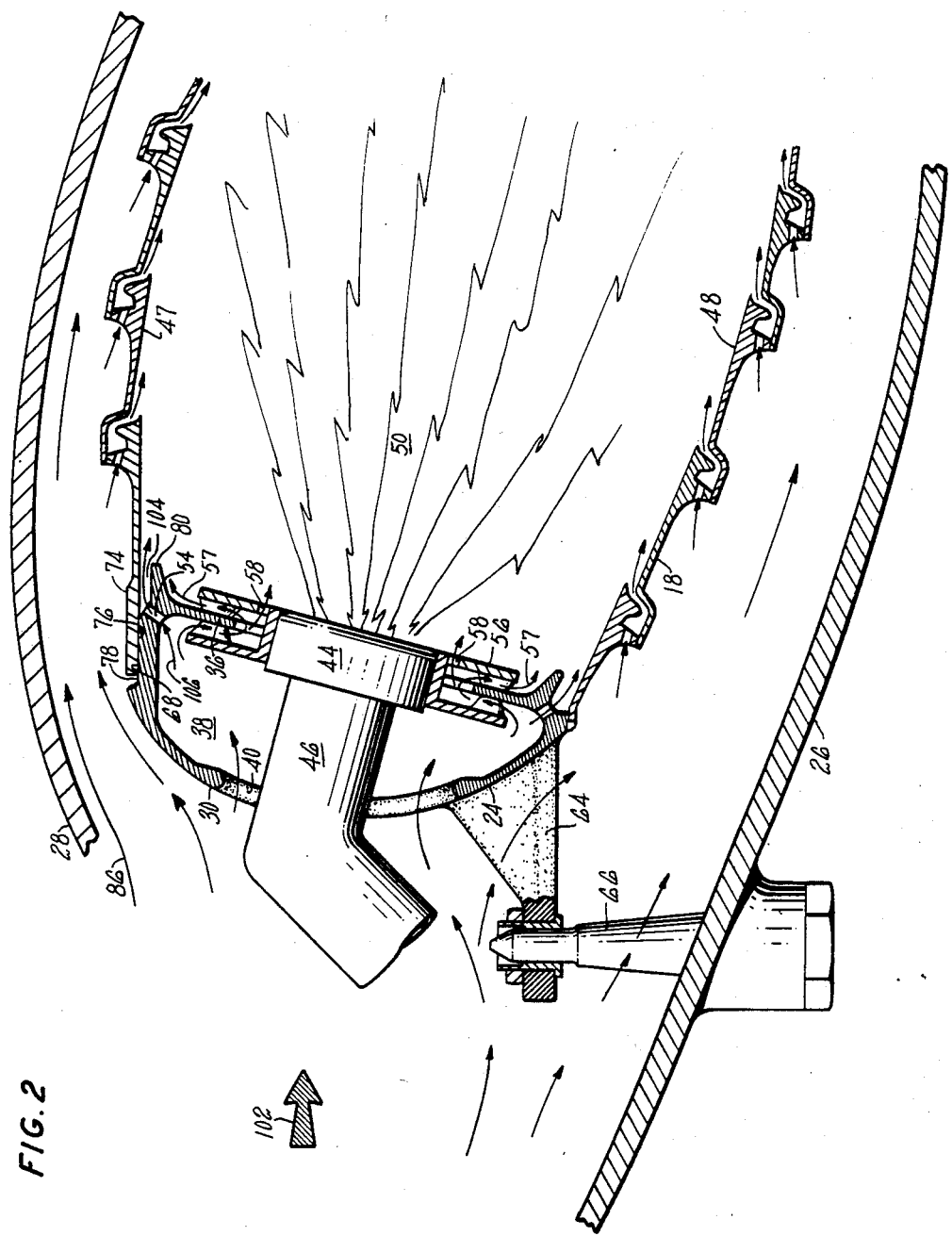
FIG. 2 shows a detailed cross sectional view of the upstream portion of a combustion chamber including a sliding joint according to the present invention.

FIG. 2 shows a more detailed cross section of the portion of the combustor section 16 which includes the combustor head 24 and the concentric, axially extending chamber liners 47, 48. The combustor head 24 is disposed in the annular compressed air stream 102, and is supported in place by the cooperation of a plurality of corresponding head lugs 64 and radial stanchions 66 secured to the outer engine casing 26 as shown in FIG. 2. The head 24 is adapted for receiving a fuel supply conduit 46 and fuel nozzle 44 therein.

The head 24 and inner and outer chamber liners 47, 48 define an annular combustion chamber 18 wherein the reacting fuel air mixture 50 is confined. In the embodiment shown in FIG. 2, combustion air is admitted to the reaction zone 50 through a plurality of openings 58 disposed in the nozzle guide 56. Cooling air from the annular air stream 102 enters the head 24 through a plurality of openings 40 in the upstream facing surface 30 thereof.

Turning now to the radially inward side of the combustor head 24 adjacent the inner engine casing 28, the sliding joint 68 according to the present invention will now be described. The combustor head 24 defines a radially inward facing cylindrical surface 78 extending axially downstream from the convex upstream dome 30 for contacting a corresponding outward facing surface 76 on the upstream end 74 of the inner chamber liner 47. This front edge, or ring, is slidably engaged with the head cylindrical surface 78, for allowing differential axial displacement between the inner chamber liner 47 and the head 24.

The radii of the head surface 78 and liner ring 74 are sized so as to provide a slight radial interference fit for ensuring engagement during assembly and under all operating conditions. The liner ring 74 is additionally radially thickened in the region of sliding engagement for preventing buckling in the ring as a result of compressive hoop stresses therein.

It is a particular feature of the sliding joint 68 according to the present invention that the sealing ring 74 of the inner chamber liner 47 is disposed radially inward of the combustor head cylindrical surface 78. Thus, as the inner chamber liner 47 is heated (and hence expanded) by radiation or other heat transfer from the high temperature reaction zone 50, the inner liner 47 and the ring 74 expand radially outward, increasing the radial compression between the head surface 78 and the corresponding ring surface 76.

The sliding joint 68 is itself isolated from the transient and other thermal effects of the high temperature reaction zone 50 by the placement of a radially extending bulkhead 36 between the engaged surfaces 78, 76 and the hot zone 50. The bulkhead 36 is cooled by a portion of the annular compressed air stream 102 which enters the combustor head 24 through a plurality of upstream facing openings 40 in the curved dome 30 of the head 24. The cooling air admitted into the plenum region 38 flows 57 over the bulkhead 36, thus forming a cooled shield between the sliding joint 68 and the hot combustion region 50.

The relative location of the sliding joint 68 and the curved surface 30 provides significant benefit should the head surface 78 and the liner ring 74 become separated due to unexpected warpage, wear, or other deformation. As will be appreciated by those skilled in the art of fluid mechanics, the annular compressed air stream 102 is both accelerated and diverted upon contact with the curved dome 30 of the annular combustor head 24. The inwardly diverted portion 86 moves at a high velocity as compared to that of the combustion products and other gases within the combustion chamber 18.

The increased velocity of the diverted airstream 86 creates a local region of reduced static pressure immediately downstream of the dome 30 and adjacent the sliding joint 68. The local region of reduced static air pressure translates into a reduced differential pressure driving air between the liner ring 74 and the head cylindrical surface 78. The sliding joint according to the present invention is thus not only configured so as to urge the ring 74 and head surface 78 more tightly together and to insulate the joint 68 itself from the thermal radiation emitted from the high temperature combustion reaction 50, but is additionally disposed in a region of decreased relative static pressure for reducing the flow of unwanted air into the combustion chamber 18 in the event that separation between the ring 74 and surface 78 does occur.

One additional feature of the preferred embodiment according to the present invention is provided by the annular trailing lip 80, extending downstream from the combustor head 24 and bulkhead 36 and spaced radially outward of the inner liner 47. Trailing lip 80 forms an annular channel 104 which contains any leakage air (not shown) which may pass between the ring 74 and head surface 78. Any such leakage air would join the inner liner cooling air 106 shown entering the channel 104 through a plurality of cooling passages 54 disposed in the head 24. Any air exiting the channel 104 thus forms a cooling film over the reaction-facing surface of the inner liner 47 and does not immediately enter the reaction zone 50. Any such unexpected leakage through the joint 68 thus does not cause degradation of the fuel-air reaction, instead augmenting the cooling protection of the liner 47.

Assembly of a combustion chamber utilizing the sliding joint according to the present invention is a straightforward process, with the mounting of the combustor head 24 being following by axially sliding the inner liner 47 into sealing engagement with the cylindrical surface 78. This step is facilitated by the annular trailing lip 80 which assists in aligning the liner ring 74 coaxially within the cylindrical head surface 78, particularly in those combustion chamber configurations wherein the inner liner 47 and head 24 are engaged blindly (i.e., cannot be viewed from the outside by manufacturing personnel).

By manufacturing the sealing ring 74 with an outer diameter slightly greater than that of the cylindrical surface 78 as noted above, a snug interference fit is provided between ring 74 and surface 78 while still permitting the surfaces to slide. The downstream portion (not shown) of the inner liner 47 may be secured to the engine casing 28 by any of a number of securing means in the art. Due to the sliding of the upstream end of the inner liner 47, the downstream means need not accommodate the differential thermal displacement between the head 24 and liner 47.

The sliding joint 68 is thus well adapted for reducing the occurrence of the air into the combustion chamber 18 of an axial flow gas turbine engine, and further includes features for minimizing the impact of any such leakage on the reacting fuel air mixture 50 therein.

It will be apparent to those skilled in the art that other, equivalent embodiments of the sliding joint disclosed hereinabove can be made without departing from the spirit and scope of the invention. The foregoing specification and appended drawing figures are thus to be taken only in an illustrative sense, with the true scope of the invention defined only by the limitations set forth in the claims hereinafter recited.

We claim:

1. A sliding joint arrangement for annular combustion chamber, comprising:
    an annular combustor head disposed in an annular stream of flowing air, the combustor having a convex upstream surface for diverting at least a portion of the flowing airstream radially inward, the head further defining a radially inward-facing cylindrical surface, located immediately downstream from the convex surface;
    an inner chamber liner, annularly downstream of the combustor head for separating the radially inward diverted portion of the flowing air stream from a high temperature combustion reaction occurring downstream of the combustor head, the inner liner further including
    an annular resilient sealing ring disposed about the upstream end of the inner liner, the sealing ring defining a radially outward facing sealing surface abutting the radially inward facing cylindrical surface for defining a sliding leak resistant sealing engagement therebetween; and
    an annular, radially extending bulkhead integral with the combustor head for forming a thermal shield between the engaged surface and ring and the downstream high temperature combustion reaction.

2. The sliding joint as recited in claim 1, wherein
    the unengaged radius of the sealing ring is greater than the radius of the cylindrical surface for creating an interference fit between the surface and ring during engagement thereof.

3. The sliding joint as recited in claim 2, wherein
    the ring defines a radially outward facing cylindrical sealing surface, and
    wherein the ring further has a radially thickened cross section adjacent the outward facing sealing surface.

4. The sliding joint as recited in claim 1, further comprising
    an annular trailing lip, extending downstream from the combustor head proximate the cylindrical surface and radially spaced apart from the inner liner, for defining an annular, downstream-opening flow channel adjacent the radially outward facing inner liner surface, whereby any air passing between the engaged head and ring is established as an annular cooling film over the inner liner.

5. An expansion joint, comprising:
    an annular gas turbine engine combustor head having an upstream convex dome portion for diverting a portion of an annular flow of compressed air into an inner annular stream;
    a head cylindrical surface disposed downstream of the dome portion and facing radially inward;
    an inner, generally cylindrical, combustion chamber liner for separating the inner annular air stream from an adjacent concentric combustion zone, the inner liner further including
    an annular upstream ring, extending axially toward the dome portion and fitting closely within the head cylindrical surface and being slidably engaged therewith and abutting the radially inward facing cylindrical surface for defining a sliding, leak resistant sealing arrangement therebetween, and
    a cooled, radially extending bulkhead disposed intermediate the slidably engaged surface and ring and the combustion zone.

* * * * *